(12) United States Patent  (10) Patent No.: US 8,490,733 B2
Kitta                      (45) Date of Patent:     Jul. 23, 2013

(54) MOTORCYCLE

(75) Inventor: Yoshiaki Kitta, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 246 days.

(21) Appl. No.: 13/020,066

(22) Filed: Feb. 3, 2011

(65) Prior Publication Data

US 2011/0192668 A1    Aug. 11, 2011

(30) Foreign Application Priority Data

Feb. 9, 2010  (JP) ................. 2010-026878
Feb. 9, 2010  (JP) ................. 2010-026919
Feb. 9, 2010  (JP) ................. 2010-026957

(51) Int. Cl.
*B62K 11/02*   (2006.01)
*F02M 25/08*   (2006.01)

(52) U.S. Cl.
USPC .................... 180/219; 123/519; 180/69.4

(58) Field of Classification Search
USPC ................... 180/219, 69.4; 123/519
See application file for complete search history.

(56) References Cited

U.S. PATENT DOCUMENTS

2011/0120796 A1   5/2011   Kuramochi et al.

FOREIGN PATENT DOCUMENTS

| JP | 56-67677 | 6/1981 |
| JP | 59-170666 | 11/1984 |
| JP | 60-104756 | 6/1985 |
| JP | 04-187861 | 7/1992 |
| JP | 06-340281 | 12/1994 |
| JP | 8-142959 A | 6/1996 |
| WO | 2009/154120 | 12/2009 |

OTHER PUBLICATIONS

Extended European Search Report (EESR) dated Aug. 6, 2012 in EP 11151236.4, which is the corresponding European Patent Office application to the instant U.S. Appl. No. 13/020,066.

*Primary Examiner* — Anne Marie M Boehler
(74) *Attorney, Agent, or Firm* — Troutman Sanders LLP (57) ABSTRACT

A seat rail constituting a rear portion of a vehicle frame, a rear cowl covering the seat rail, and a canister adsorbing a vaporized gas generated in a fuel tank disposed on a front portion of the vehicle frame are provided. As for the canister, a plurality of canisters are constituted to be connected in series. At least one of the canisters is disposed between one side of the seat rail and the rear cowl, and the other canister/canisters is/are disposed between the other side of the seat rail and the rear cowl.

9 Claims, 10 Drawing Sheets

MOTORCYCLE

CROSS-REFERENCE TO RELATED APPLICATIONS

This application is based upon and claims the benefit of priority of the prior Japanese Patent Application No. 2010-026878, filed on Feb. 9, 2010, the Japanese Patent Application No. 2010-026919, filed on Feb. 9, 2010, and the Japanese Patent Application No. 2010-02697 filed on Feb. 9, 2010, the entire contents of which are incorporated herein by reference.

BACKGROUND OF THE INVENTION

1. Field of the Invention

The present invention relates to a motorcycle being a motorcycle in which particularly, riding comfort of a pillion passenger is allowed to be improved effectively, and particularly to a disposition structure and the like of a canister to be mounted on the above.

2. Description of the Related Art

Conventionally, it has been known that in a fuel tank of a motorcycle, a stored fuel vaporizes to be retained in an upper portion of the fuel tank as a vaporized gas. The fact that the above vaporized gas leaks into the air while an engine is stopping or the like results in a waste of the fuel, and an effect on the environment is also concerned. In order to solve such problems, in Patent Document 1, there has been disclosed a structure in which a canister is disposed on a seat rail of a motorcycle, and a vaporized gas in a fuel tank is led to the canister to make an activated carbon or the like in the canister adsorb the vaporized gas, and thereafter at the time when an engine starts, the vaporized gas in the canister is drawn into a carburetor.

[Patent Document 1] Japanese Patent No. 3223729

However, in the structure of attaching the canister described in Patent Document 1, the canister is housed and disposed inside, so that a rear cowl covering the canister is required to bulge laterally. Consequently, in the case when a pillion passenger rides the motorcycle, a problem that the rear cowl touches a medial side of a leg part of the pillion passenger to thereby affect his/her riding comfort significantly or the like is caused.

Further, in recent years, a vehicle provided with a fuel tank larger than that of a conventional motorcycle has been developed in order to make long touring possible. In such a large-sized fuel tank, more vaporized gas is generated, so that a canister is required to be enlarged. However, with the enlargement of the canister, a vehicle width is increased only on one side of the right and left sides. Consequently, in the case when a driver desires to have his/her foot touch the ground on a side where the canister is disposed in a state of being on the motorcycle, a problem that the foot does not easily reach the ground is caused, so that it has been impossible to sufficiently increase a capacity of the canister. Further, the canister is mounted only on one side, and thereby a difference in a balance between the right and left weights occurs, and it is feared that at the time when the vehicle turns, operability such that operating feeling differs between the right turn and the left turn deteriorates.

Further, the canister is a container containing an adsorbent therein in general, so that it is desirable to avoid applying a high impulse force to the canister. However, in the motorcycle disclosed in Patent Document 1, it is feared that at the time when the vehicle topples over, the canister comes into contact with the ground and thereby a high impulse force is applied to the canister.

SUMMARY OF THE INVENTION

In consideration of problems as above, the present invention has an object to provide a motorcycle with good riding comfort of a pillion passenger even in the case when a canister and so on are disposed on a seat rail.

Further, the present invention has an object to provide a canister disposition structure of the motorcycle in which a capacity of the can is increased and that is excellent in a foot grounding property and has well-balanced operating feeling.

Further, the present invention has an object to provide a canister attaching structure of the motorcycle in which the riding comfort of the pillion passenger is improved and high safety to the canister is secured.

In order to solve the above-described problems, a motorcycle of the present invention includes: a seat rail constituting a rear portion of a vehicle frame; a rear cowl covering the seat rail; and a canister adsorbing a vaporized gas generated in a fuel tank disposed on a front portion of the vehicle frame, in which as for the canister, a plurality of canisters are constituted to be connected in series, and at least one of the canisters is disposed between one side of the seat rail and the rear cowl, and the other canister/canisters is/are disposed between the other side of the seat rail and the rear cowl.

Further, the motorcycle of the present invention, in which the rear cowl has hollow portions that are each made in a manner that a predetermined region of a side surface of the rear cowl is recessed provided therein, and the canisters are disposed at the rear of the hollow portions respectively.

Further, the motorcycle of the present invention, in which the vehicle frame has a prop stand provided on one side of the right and left sides of a vehicle, the canister on an upstream side connected to the fuel tank is disposed on an outer side surface of the seat rail on a side opposite to the prop stand, and the canister on a downstream side connected to the canister on the upstream side is disposed on an outer side surface of the seat rail on a side opposite to the canister on the upstream side.

Further, the motorcycle of the present invention, in which the hollow portions are formed so that a pillion passenger that rides on a rear seat is allowed to be seated to have his/her leg parts fit along the hollow portions respectively.

Further, the motorcycle of the present invention further includes: pillion steps for a pillion passenger that extend downward under the seat rail respectively; a front seat disposed on the rear cowl and at the rear of the fuel tank; and a rear seat disposed on the rear cowl and at the rear of the front seat, in which the hollow portions are disposed between the front seat and the pillion steps in a front and rear direction of the vehicle respectively.

Further, the motorcycle of the present invention, in which the hollow portions are each formed so that the most inward point made after the predetermined region is hollowed most inwardly is formed at an upper end of the hollow portion and a dimension in a vehicle width direction is increased as it goes downward from the most inward point.

Further, the motorcycle of the present invention, in which the hollow portions are each formed in a substantially inverted triangle shape in which two angles of the substantially inverted triangle shape are included in the upper end in a side view, and a third angle disposed below the two angles in a vertical direction is disposed on a side at the rear of the most inward point in the front and rear direction of the vehicle.

Further, the motorcycle of the present invention, in which the seat rail has an inward portion whose dimension in the vehicle width direction reduces as it goes rearward provided in side surfaces thereof, and the canisters are disposed at the rear of front ends of the inward portions and between the rear cowl and the seat rail respectively.

Further, the motorcycle of the present invention, in which the inward portions are each provided on a rear portion side of the seat rail and are covered with the rear cowl, and a front portion side of the seat rail is exposed to the outside of the rear cowl.

Further, the motorcycle of the present invention further includes: pillion steps for a pillion passenger that extend downward under the seat rail respectively, in which the canisters are attached to the seat rail positioned more inwardly than outer side ends of the pillion steps respectively.

DETAILED DESCRIPTION OF THE PREFERRED EMBODIMENTS

Hereinafter, preferred embodiments of a motorcycle according to the present invention will be explained based on the drawings.

First, detailed structures of the present invention will be explained by using FIG. 1 to FIG. 7. Incidentally, directions to be described in the following explanation are indicated based on directions seen from a driver at the time of riding a vehicle. In the above case, in each of the drawings to be used in the explanation, the front of the vehicle is indicated by an arrow Fr and the rear of the vehicle is indicated by an arrow Rr, and further the lateral right side of the vehicle is indicated by an arrow R and the lateral left side of the vehicle is indicated by an arrow L as necessary.

Vehicle Whole Structure

Figure 1:
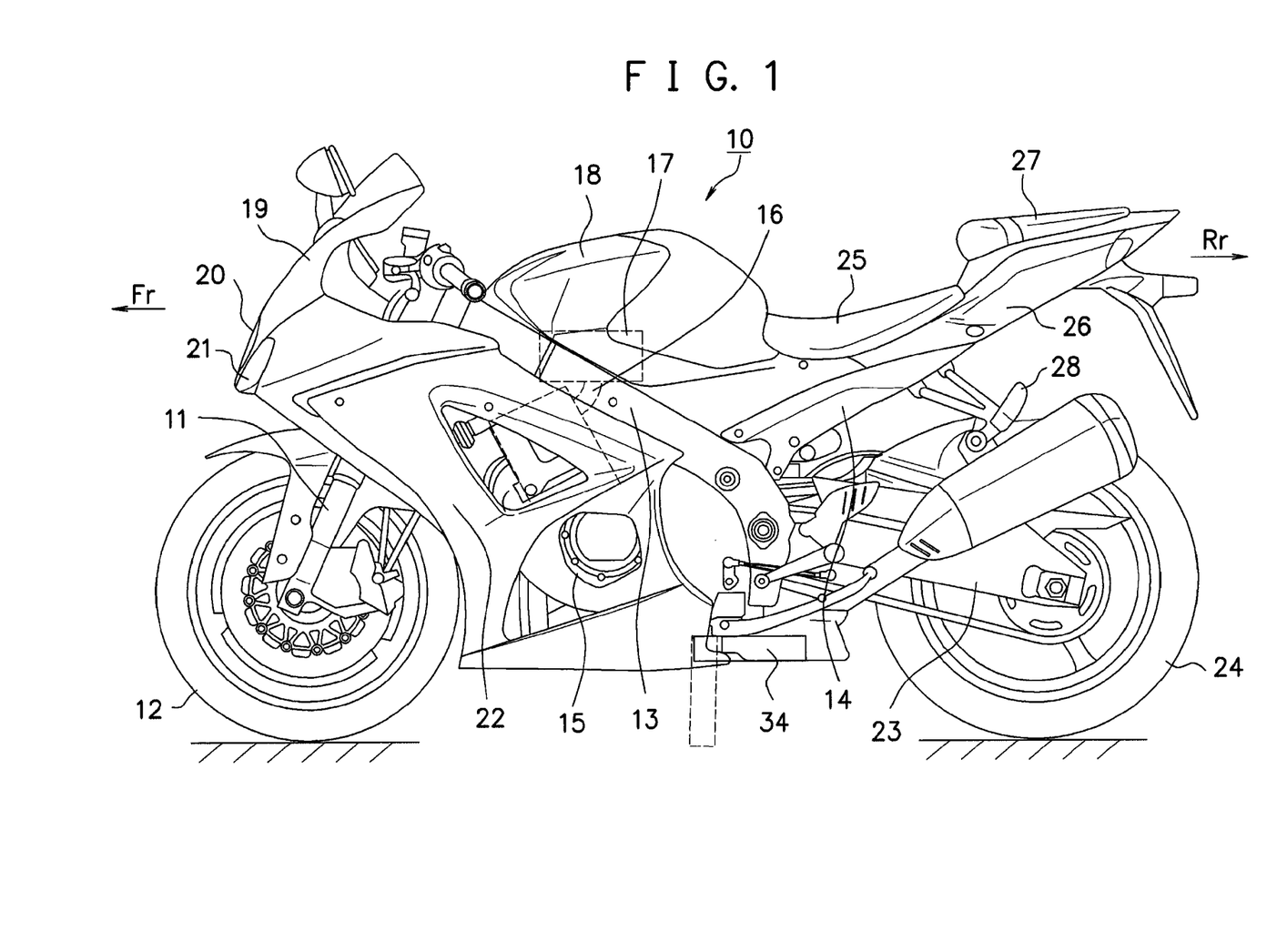
FIG. 1 is a left side view of a vehicle to which the present invention is applied.

First, the vehicle whole structure to which the present invention is applied will be explained. In a motorcycle 10, a front fork 11 supported to be able to pivot rightward and leftward is provided at a front end of a vehicle frame extending in a front and rear direction of the vehicle, and a front wheel 12 is attached in the above front fork 11. The vehicle frame is composed of a main frame 13 constituting a substantially front half portion of the vehicle and a seat rail 14 constituting a rear half portion of the vehicle, and an engine 15 is attached to the main frame 13 under the main frame 13.

A throttle body 16 adjusting an air amount to be supplied to the engine 15 and an air cleaner 17 supplying air to the above throttle body 16 are continuously connected upward to a rear upper portion of the engine 15. A fuel tank 18 is mounted on the main frame 13 on the air cleaner 17, and is connected to a fuel injection system and a fuel hose (both not illustrated) that are attached to the above-described throttle body 16, and thereby a fuel is supplied.

Further, a front cowl 19 is attached to a front portion of the vehicle. On the front cowl 19, a head lamp 20 and a pair of right and left direction indicators 21 are provided. To a lower end of the front cowl 19, side cowls 22 covering side surfaces of the vehicle are connected.

A swing arm 23 is attached to a rear portion of the main frame 13 in a swingable manner and a rear wheel 24 is attached to a rear end of the above swing arm 23, and similarly to a well-known technique, motive power of the engine 15 is transmitted to the rear wheel 24, and thereby the rear wheel 24 is driven. The seat rail 14 is mounted on an upper side of the rear portion of the main frame 13 and is provided to extend rearward and upward. At the rear of the fuel tank 18, a front seat 25 on which a driver is seated is disposed on an upper surface of a rear cowl 26. The front seat 25 is fixed to the seat rail 14.

A rear seat 27 on which a pillion passenger is seated is mounted at the rear of and above the front seat 25. Further, below a rear portion of the front seat 25, pillion steps 28 on which the pillion passenger puts his/her feet respectively are each fixed and provided to a lower portion of the seat rail 14. The pillion steps 28 are provided in a manner that stays 29 of the pillion steps 28 extend rearward and downward from positions attached to the seat rail 14 respectively, and step portions 30 on which feet are put respectively are each disposed on a tip of the stay 29. The above step portions 30 are each positioned between the front seat 25 and the rear seat 27 in the front and rear direction. The step portions 30 are each formed to be able to be folded upward and rearward of the vehicle as shown by a dotted line in FIG. 2. According to the above structure, it is possible for the pillion passenger to be seated on the rear seat 27 to put his/her feet on the pillion steps 28 respectively and to sandwich a lumbar part of the driver by his/her knees, (which is called knee grip), to thereby stabilize his/her posture.

Figure 6:
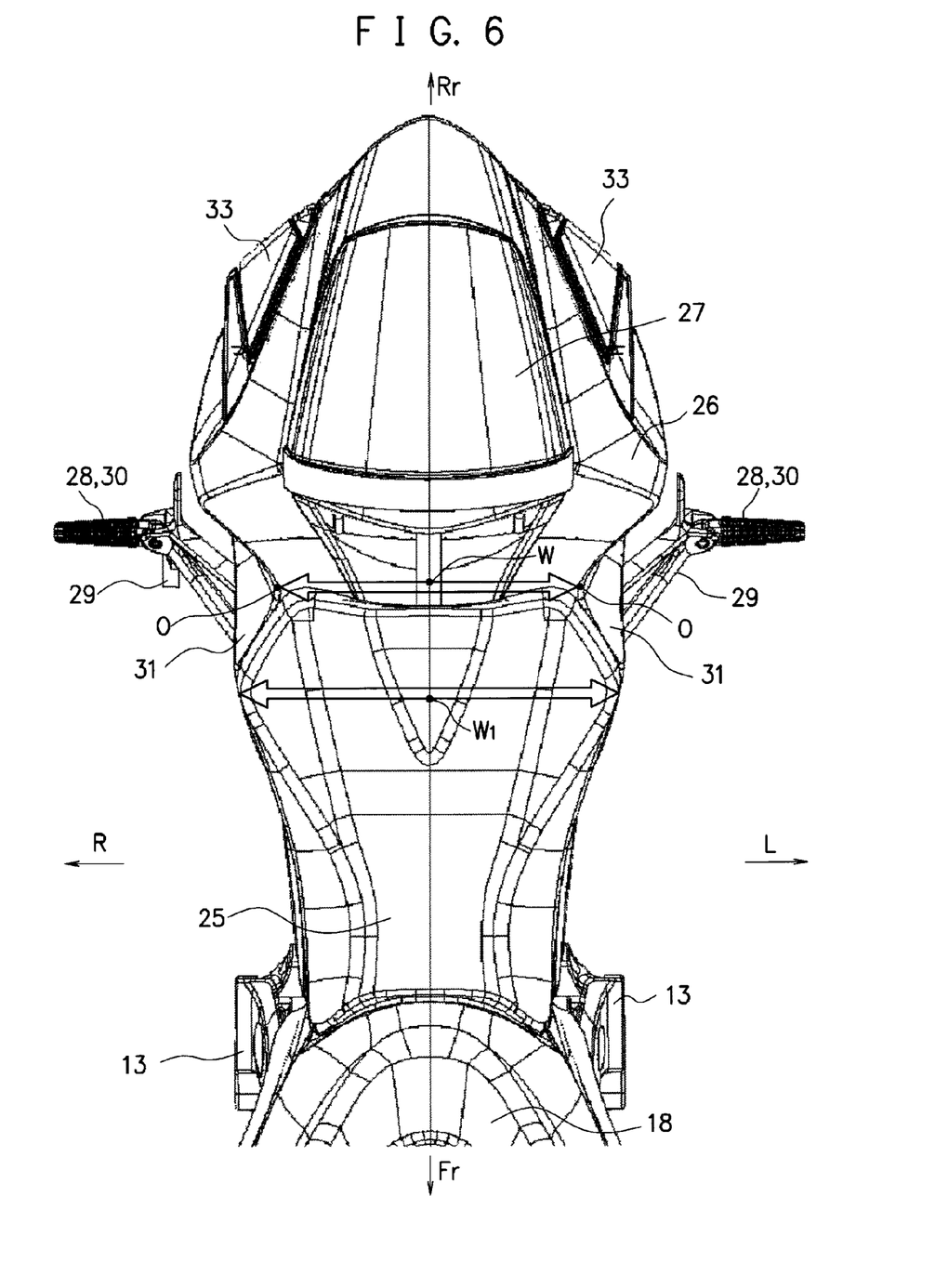
FIG. 6 is a plan view of the rear portion of the vehicle in the embodiment of the present invention.
Figure 7:
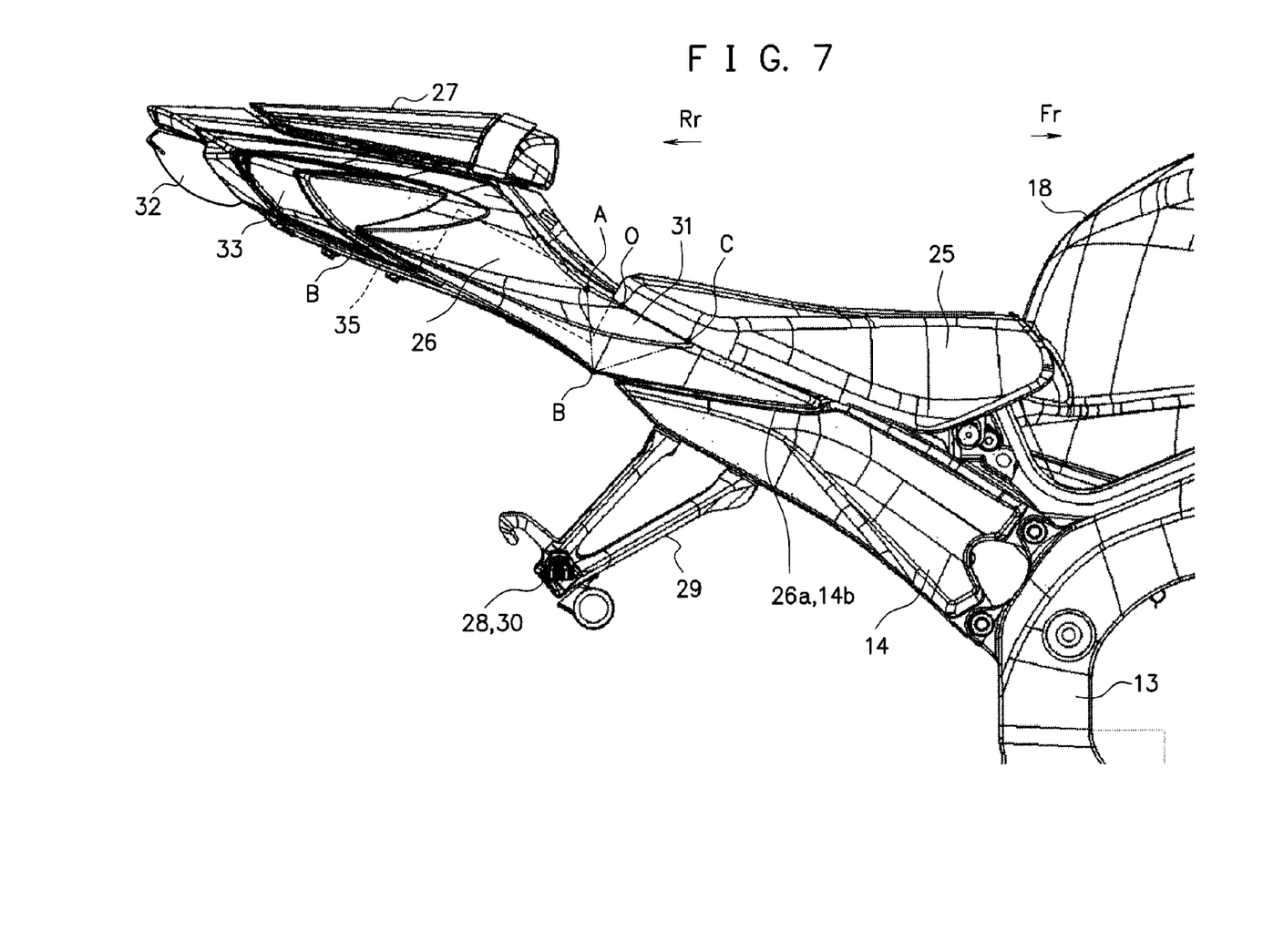
FIG. 7 is a side view of the rear portion of the vehicle in the embodiment of the present invention.

Further, with reference to FIG. 6, a hollow portion 31 in a substantially U (or V)-shape is formed in right and left side surfaces of the rear cowl 26 and between the front seat 25 and the rear seat 27. A vehicle width dimension w of the rear cowl 26 formed between the above hollow portions 31 is set smaller than a maximum width $w_1$ of the front seat 25. Further, the hollow portions 31 are each formed in a manner that as it goes downward from the most inward point O of the hollow portion 31, the vehicle width dimension w becomes wider in a vehicle width direction. Further, as shown in FIG. 7, when angles or points of a triangle formed by each of the hollow portions 31 are set to A, B, and C in a side view, a triangular shape formed in a manner that the angle B (or B point) of the triangle is positioned significantly rearward with respect to the A point and C point is exhibited.

When it is formed in this manner, in the case when the pillion passenger performs the knee grip as described above, by fitting his/her medial crura in the hollow portions 31 respectively, it becomes possible to reduce a distance between his/her knees and it makes it easy for the pillion passenger to sandwich the lumber part of the driver. Further, when the knee grip is performed in the hollow portions 31, crura of both legs of human being are in a substantially truncated inverted V-shape, namely the crura spread widely on a lower side.

Thus, if the rear cowl 26 is hollowed to be the same depth (a depth of a V-shaped valley) from an upper end (A point side or C point side) of each of the hollow portions 31 to a lower end (B point side) thereof, the crura go away from the rear seat 27 as it goes downward. Thus, in the present invention, it is formed so that the depth of the valley in each of the hollow portions 31 becomes shallower as it goes downward.

Further, even when each of the hollow portions 31 is formed along a vertical direction, it makes it possible to perform the knee grip more firmly. In the above case, as is a virtual line AB, for example, a plane perpendicular to a traveling direction of the vehicle is formed, and thus it is feared that the above plane is exposed to traveling air to make traveling performance deteriorate. Consequently, each of the hollow portions 31 is formed so that the B point is formed at the rear of at least the A point to make traveling air flow downward along a side AB.

Side surfaces and part of an upper surface of the seat rail 14 are covered with the rear cowl 26. A tail lamp 32 and a pair of right and left direction indicators 33 are provided at a rear end of the rear cowl 26. Further, at a lower portion on the left side of the vehicle, a prop stand 34 supporting a vehicle body at the time of parking is pivotally (see a dotted line in FIG. 1) attached to the main frame 13.

Canister Disposition Structure

Next, the canister disposition (or attaching) structure of the present invention will be explained by mainly using FIG. 2 to FIG. 4.

Figure 2:
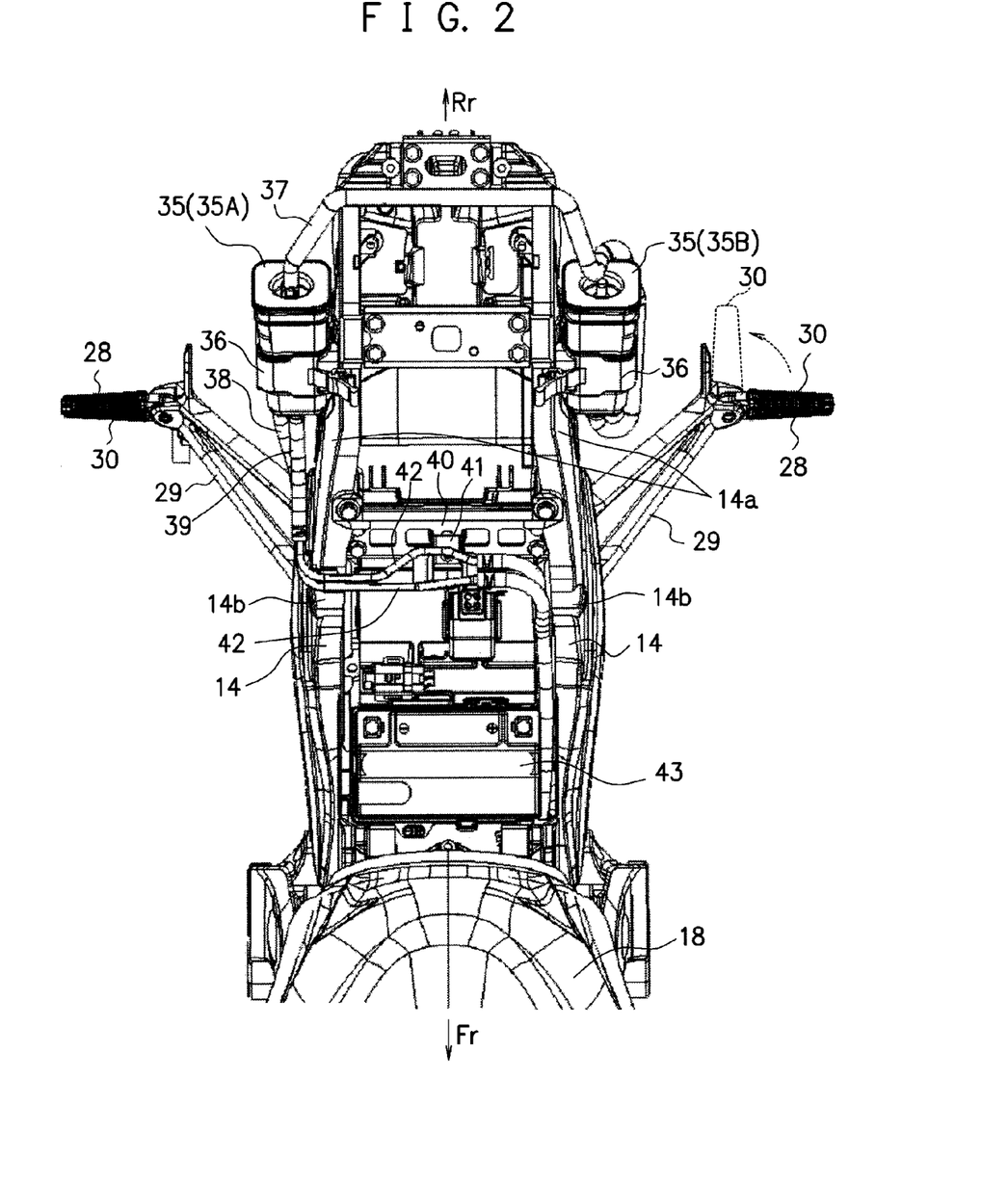
FIG. 2 is a plan view of a rear portion of the vehicle in which vehicle exterior parts are removed in an embodiment of the present invention.

In FIG. 2, the seat rail 14 has, in a plan view, an inward portion 14a whose dimension in the vehicle width direction reduces as it goes rearward provided in the right and left side surfaces thereof. The seat rail 14 at the rear of front ends 14b of the inward portions 14a has the side surfaces and part of the upper surface thereof covered with the rear cowl 26. Further, front end lower portions 26a of the rear cowl 26 are each formed along the front end 14b of the inward portion 14a (see also FIG. 7).

Figure 3:
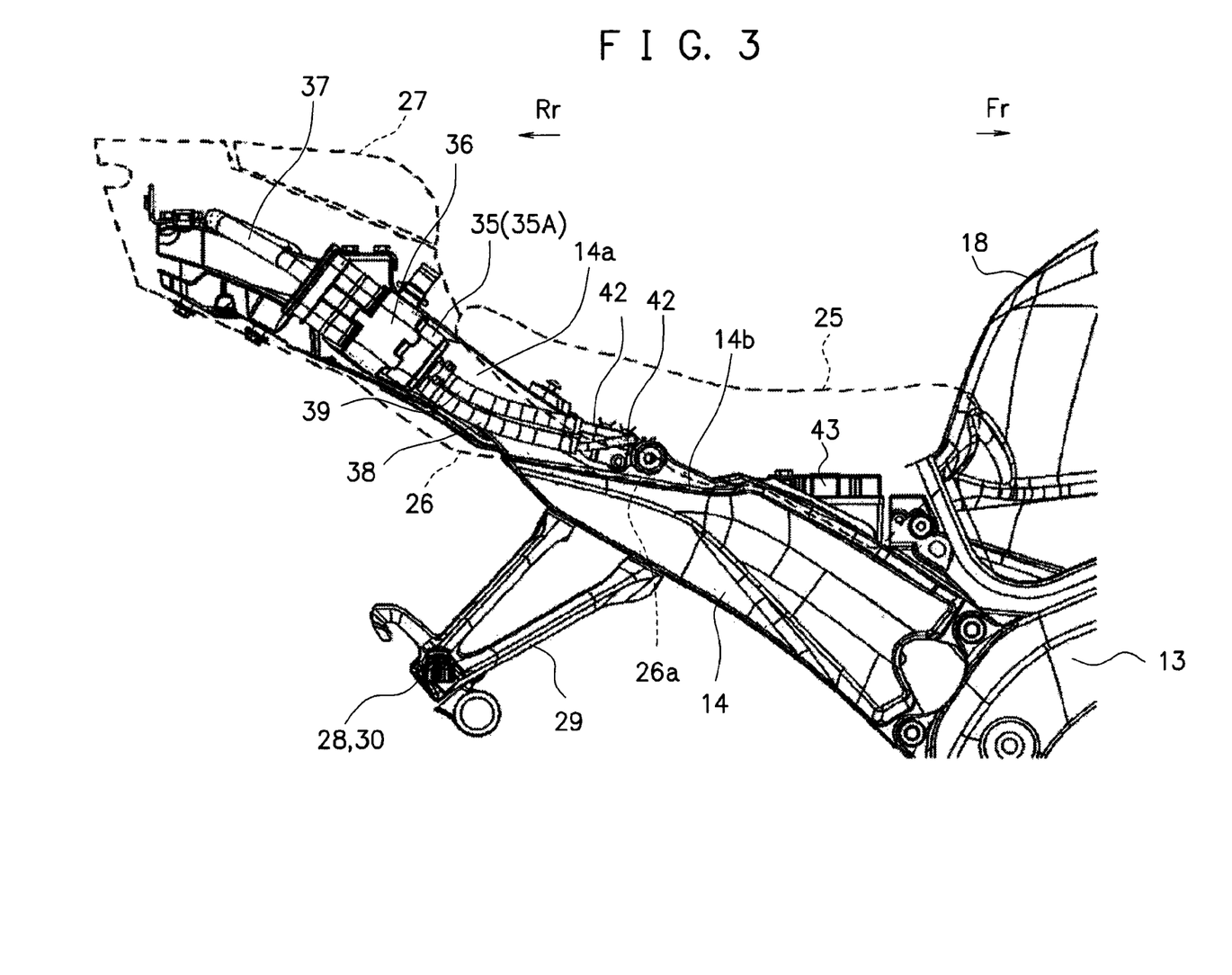
FIG. 3 is a right side view in FIG. 2.
Figure 4:
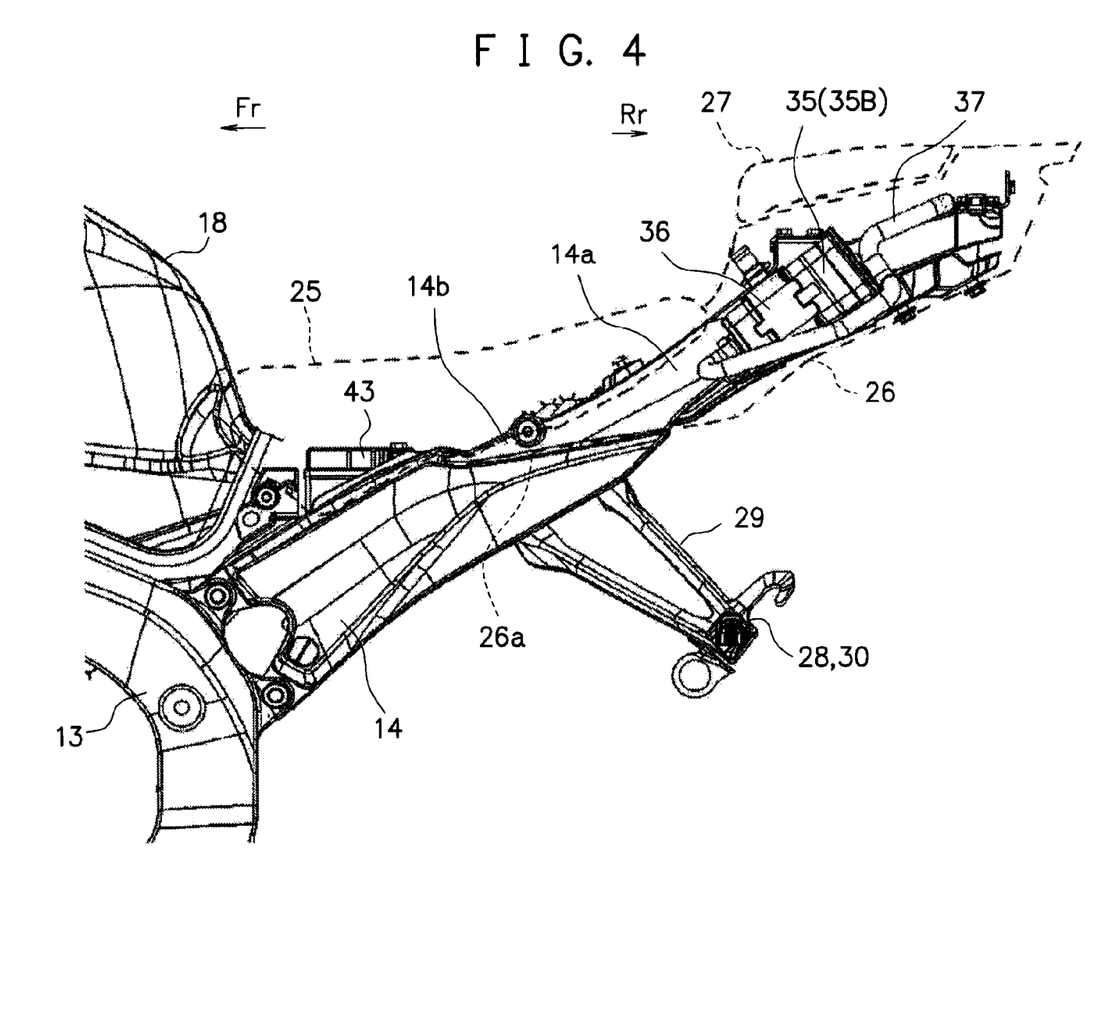
FIG. 4 is a left side view in FIG. 2.

In FIG. 3 and FIG. 4, as for canisters 35 of the present invention, at the rear of the front end 14b of the inward portion 14a and at the rear of the hollow portion 31 of the rear cowl 26, a first canister 35A is disposed on the right side surface of the seat rail 14 and a second canister 35B is disposed on the left side surface of the seat rail 14 respectively. These canisters 35A, 35B are each fixed to the seat rail 14 by a fixing belt 36. By attaching the canisters 35 at the rear of the hollow portions 31 respectively in this manner, in designing the hollow portions 31, it is possible that design flexibility of the hollow portions 31 is secured sufficiently, and then the shapes along the crura of the pillion passenger are provided and further the posture of the pillion passenger is stabilized.

Further, the canisters 35 are a container containing an adsorbent therein in general, so that it is desirable to avoid applying a high impulse force to the canisters 35. For example, in the case when the canisters 35 are each attached at a similar position in a state where no inward portion 14a is provided tentatively, the canisters 35 are each provided in a manner that an outer side surface of the canister 35 protrudes outwardly over the pillon step 28. When it is assumed that the vehicle topples over in such a state, the rear cowl 26 covering the canister 35 comes into contact with the ground before the pillion step 28 comes into contact with the ground, and next a fear of applying a high impulse force to the canister 35 is caused.

Thus, as is the present invention, the inward portions 14a are provided so as to reduce a width of the vehicle frame, and the canisters 35 are attached at the rear of the front ends of the above inward portions 14a respectively, and thereby the canisters 35 can be provided more inwardly than the pillion steps 28, and the canisters 35 can be protected from a high impulse force.

Canister Piping Structure

Next, the canister piping structure of the present invention will be explained by mainly using FIG. 2 to FIG. 4, and FIG. 5.

The canister piping structure is constituted in a manner that a coupling hose 37 is connected to a rear end of the first canister 35A, and the above coupling hose 37 extends to the left side of the vehicle along a rear end upper surface of the seat rail 14, and thereafter goes under the second canister 35B and connects to a front end of the second canister 35B. A gas recovery tube 39 coupling an upper portion of the fuel tank 18 and the first canister 35A and a gas supply tube 38 coupling the first canister 35A and the throttle body 16 are connected to a front end of the first canister 35A.

Figure 5:
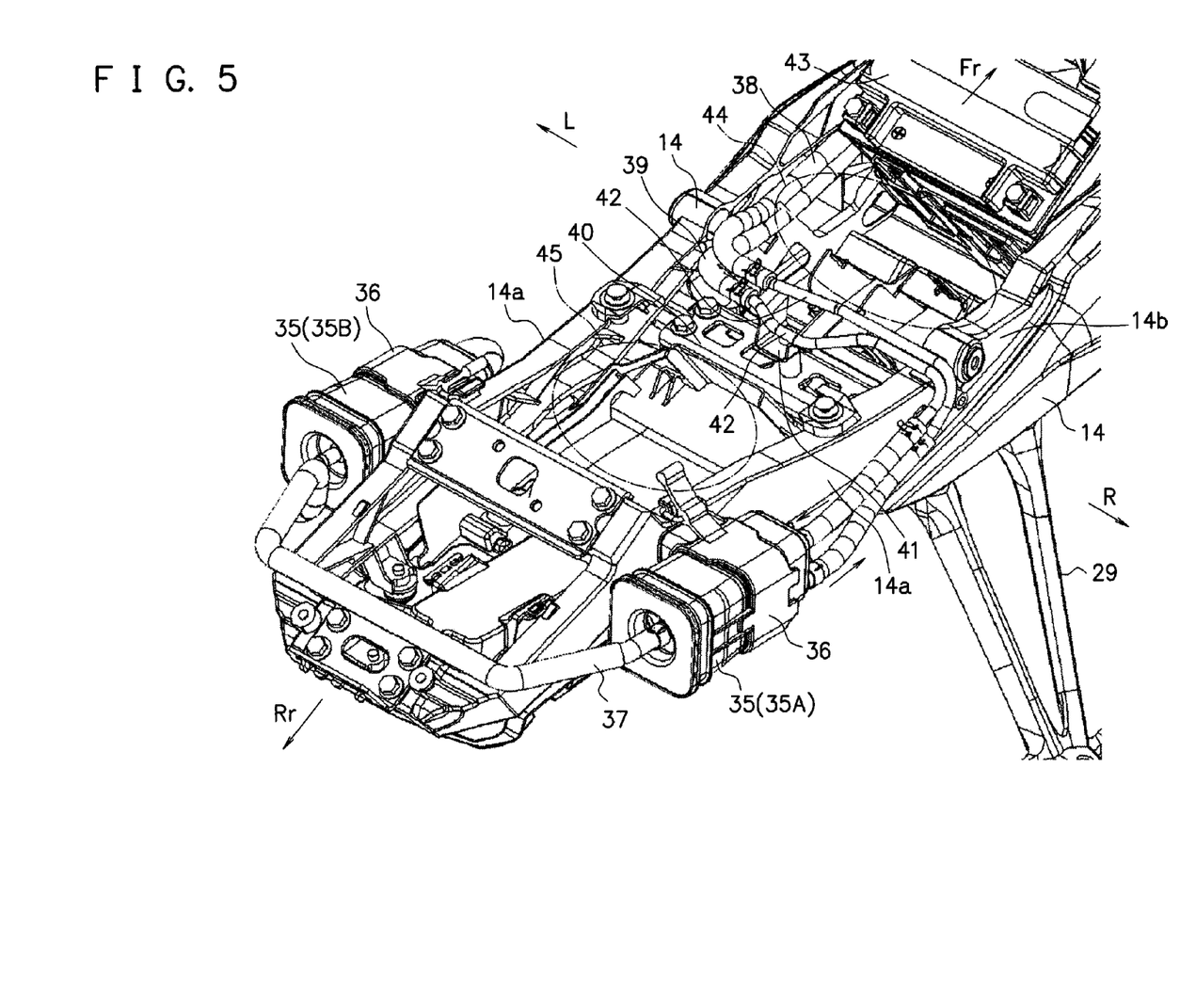
FIG. 5 is a rear perspective view in FIG. 2.

More concretely, the gas recovery tube 39 and the gas supply tube 38 are both extended forward from the front of the first canister 35A, and thereafter are turned to a direction to the left side of the vehicle and are supported by a fixing bracket 41 set up on an intermediate bridge 40 coupling the right and left sides of the seat rail 14 and are extended to an inner surface on the left side of the seat rail 14. In FIG. 5, of the gas recovery tube 39 and the gas supply tube 38, portions each from an outer surface on the right side of the seat rail 14 to the left of the fixing bracket 41 are formed of a metal pipe 42. Generally, a lightweight rubber material is used for the tubes through which vaporized gas passes.

In the above case, both the gas recovery tube 39 and the gas supply tube 38 are required to pass between the front seat 25 and the seat rail 14. Thus, in the case when a rubber tube that is thick and has a thick outside diameter is used tentatively, the front seat 25 is set further upward and thereby a seat height of the front seat 25 is increased, and if the rubber tube is employed as it is, a fear of making a foot grounding property of the driver deteriorate is caused. Thus, the metal pipes 42 each having a relatively small tube diameter are employed and thereby the foot grounding property is improved.

Here, a space between the front of the intermediate bridge 40 and the rear of a battery 43 is laid out as an auxiliary machine component storage space 44 where sensors and electrical components necessary for operating the engine 15, the head lamp 20, and the like are to be stored. Further, a space at the rear of the intermediate bridge 40 is laid out as a tool storage space 45.

The gas recovery tube 39 is turned to the front along the inner surface on the left side of the seat rail 14 and passes through a space between the battery 43 and the seat rail 14 and extends to a bottom of the fuel tank 18 and enters the fuel tank 18 from the bottom of the fuel tank 18 and extends to an upper portion inside the fuel tank 18. On the other hand, the gas supply tube 38 is turned to the front from the inner surface on the left side of the seat rail 14 and is connected to the throttle body 16 via a purge valve (not illustrated) that is opened and closed by a negative pressure in the throttle body 16.

In the above-described structure, a vaporized gas that is retained in the upper portion inside the fuel tank 18 passes through the gas recovery tube 39 and is adsorbed to an adsorbent (for example, an activated carbon) in the first canister 35A. Then, when the first canister 35A is filled with the vaporized gas, the vaporized gas is adsorbed to an adsorbent in the second canister 35B through the coupling hose 37. At the time when the engine 15 starts, the purge valve is opened as, for example, engine speed increases, and further the inside of the throttle body 16 is brought into a negative pressure, and thereby the vaporized gases adsorbed in the first canister 35A and the second canister 35B are drawn into the throttle body 16 to be supplied to the engine 15.

Figure 8:
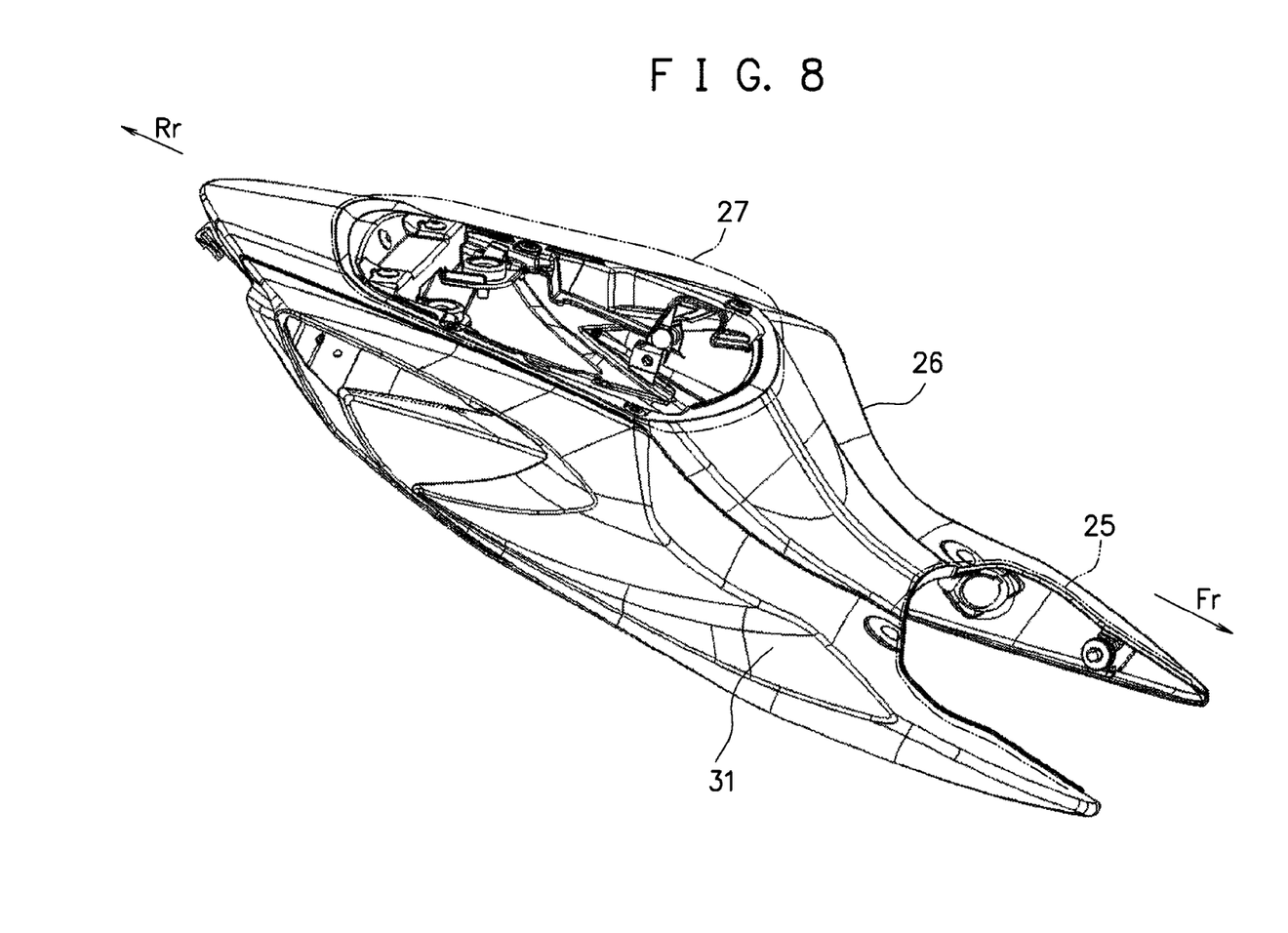
FIG. 8 is a front perspective view of a rear cowl according to the present invention.
Figure 9:
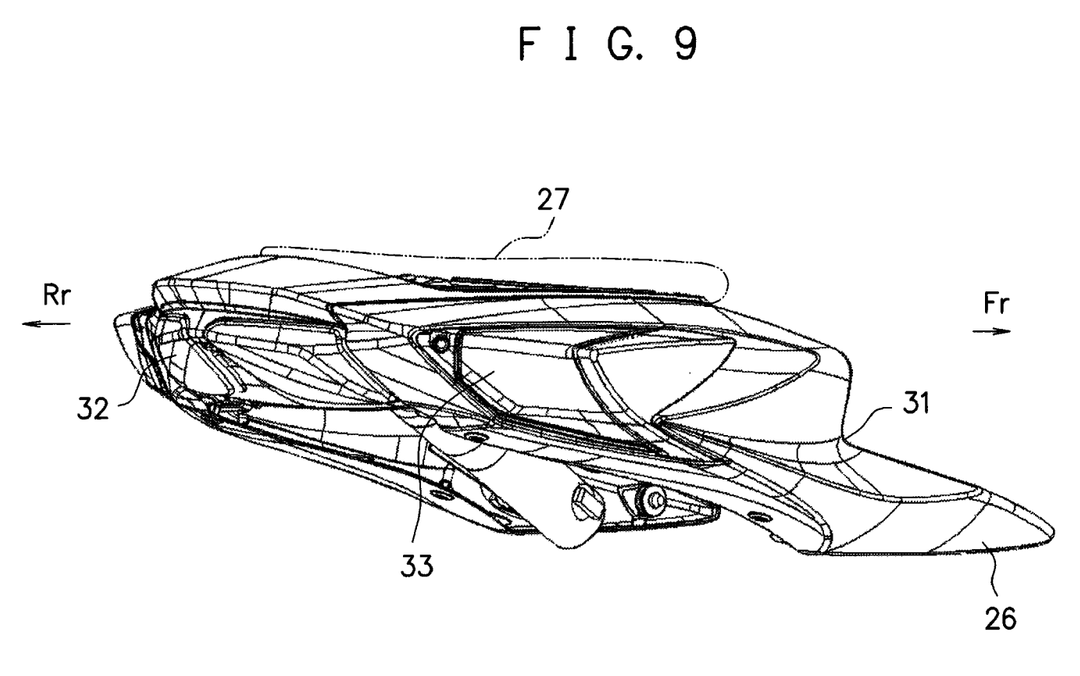
FIG. 9 is a rear perspective view of the rear cowl according to the present invention.
Figure 10:
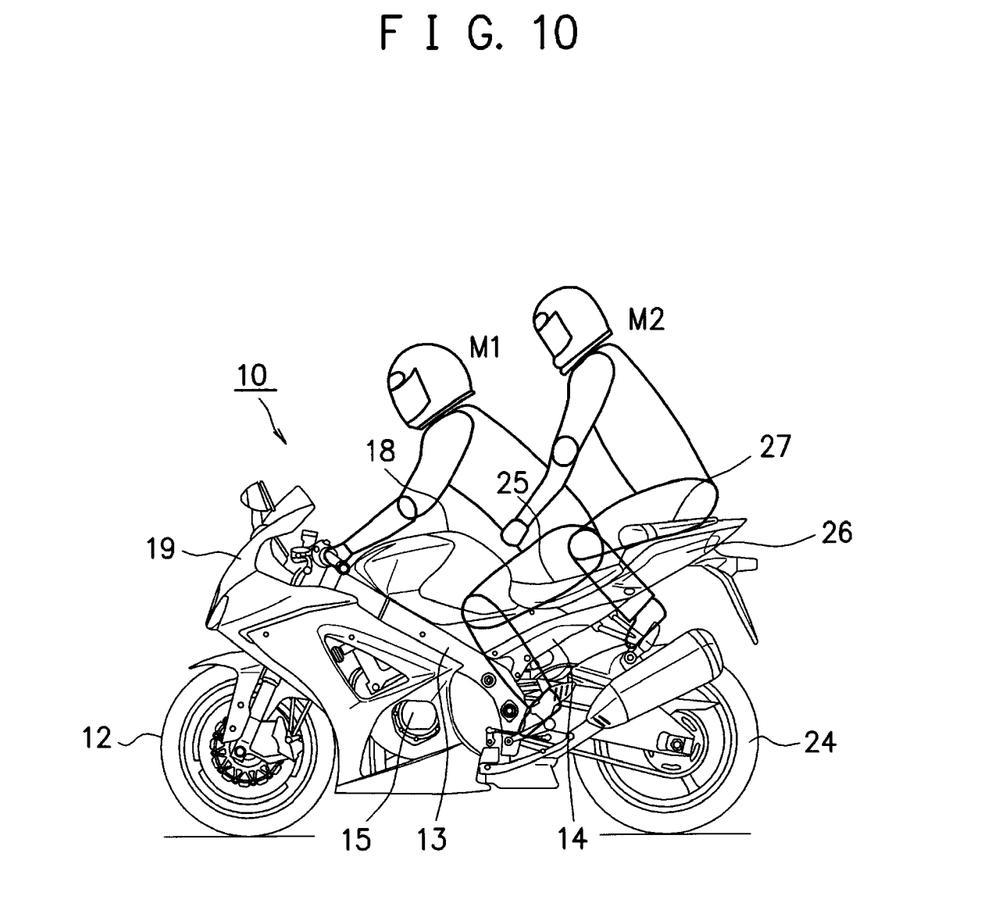
FIG. 10 is a left side view showing postures and the like at the time of riding the vehicle to which the present invention is applied.

Then, in the motorcycle of the above-described present invention in particular, the hollow portions 31 made in a manner that predetermined regions of the side surfaces of the rear cowl 26 are recessed are first provided as also shown in FIG. 8 and FIG. 9. Here, as shown in FIG. 10, a pillion passenger $M_2$ is seated on the rear seat 27 at the rear of a driver $M_1$ while punning his/her feet on the step portions 30 of the pillion steps 28 respectively. At this time, the pillion passenger $M_2$ is seated while fitting his/her leg parts along the hollow portions 31 respectively, and thereby the stronger knee grip is made possible and his/her posture during running can be stabilized.

Further, the hollow portions 31 are each formed between the front seat 25 and the pillion step 25 as described above. Here, at the time of rapid acceleration when the vehicle starts moving or the like, a force toward the rear of the vehicle is generated in the pillion passenger $M_2$ by an inertial force. In order to resist the above force, the pillion passenger is required to have a posture in which his/her heels are positioned at the rear of his/her knees when performing the knee grip. Thus, the pillion steps 28 are each provided at the rear of the front seat 25 in the front and rear direction, and consequently, the leg parts of the pillion passenger $M_2$ pass through the sides of the rear cowl 26 between the front seat 25 and the pillion steps 28 respectively. Thus, the hollow portions 31 are each provided in the side surface of the rear cowl 26 between the front seat 25 and the pillion step 28, and thereby the posture of the pillion passenger $M_2$ can be stabilized more firmly. Accordingly, it is possible to secure running stability and to improve safety as the time of running.

Further, when performing the knee grip, the pillion passenger $M_2$ rides the vehicle so as so most reduce a distance between his/her knees that sandwich a lumbar part of the driver $M_1$ and to spread his/her legs toward his/her heels (to have a posture in which his/her legs are spread in a truncated inverted V-shape from his/her knees to his/her heels). In the above case, the hollow portions 31 of the rear cowl 26 are formed so as to fit along the leg parts of the pillion passenger $M_2$ respectively in the present invention, and thereby the pillion passenger $M_2$ can sandwich not only the lumbar part of the driver $M_1$ but also the rear cowl 26 simultaneously, resulting that his/her posture can be more stabilized. Further, when the grip of the lumbar part is weakened due to vibration of the vehicle or the like, the pillion passenger $M_2$ can sandwich the rear cowl 26 soon, resulting that the safety can be improved also in the above point.

Further, in the present invention, the hollow portions 31 are each formed in a substantially inverted triangle shape whose two angles A, C (see FIG. 7) are included in the upper end in a side view, and the inverted triangle shape is designed so that the third angle B is positioned as the rear of the two angles A, C. Here, in the case when each of the hollow portions 31 is provided vertically, a wall (the virtual line AB in FIG. 7) substantially vertical to the traveling direction of the vehicle is formed, and air resistance occurs due to the wall. Thus, as described above, each of the hollow portions 31 is designed to be in an inverted triangle ABC shape in a side view and to make the angle B of the inverted triangle ABC shape positioned at the rear, and thereby it is possible to make traveling air flow downward along the side AB and to suppress the air resistance effectively.

Further, the canisters 35 are attached at the rear of the hollow portions 31 respectively, so that the canisters 35 can be attached without affecting the posture of the pillion passenger $M_2$.

(Second Embodiment)

Next, a second embodiment in the motorcycle according to the present invention will be explained. Incidentally, members that are the same as or correspond to those of the above-described embodiment are denoted by the same reference numerals and symbols and the explanation is conducted.

In the second embodiment of the present invention in particular, as for the plurality of canisters 35, in this example, two of the first canister 35A and the second canister 35B are first connected in series, and the first canister 35A is attached on one side of the seat rail 14 and the second canister 35B is attached on the other side of the seat rail 14.

Consequently, without increasing the vehicle width only on one side, the excellent foot grounding property can be obtained and the canisters 35 can be enlarged respectively.

Further, the inward portion 14a whose dimension in the vehicle width direction reduces as it goes rearward is provided in the outer side surfaces of the seat rail 14, and the canisters 35 are each fixed to the outer side surface at the rear of the front end of the above inward portion 14a.

Consequently, it becomes possible to prevent the rear cowl 26 from bulging in the vehicle width direction more efficiently.

Further, by disposing the canisters 35 at the rear of the hollow portions 31 provided in the rear cowl 26 respectively, the pillion passenger, when performing the knee grip, can reduce the distance between his/her knees, so that the pillion passenger can sandwich the lumbar part of the driver more firmly and maintain his/her stable posture.

Further, at the time of parking, the motorcycle 10 is supported in a state inclined toward a prop stand 34 side. In the above case, the first canister 35A is attached to the seat rail 14 on a side opposite to the prop stand 34 and the second canister 35B is attached to the seat rail 14 on the prop stand 34 side, thereby enabling the second canister 35B to be positioned lower than the first canister 35A. The vaporized gas has a specific gravity heavier than that of air, so that the vaporized gas that reaches the first canister 35A is soon carried no the second canister 35B and thus the adsorbent in the second canister 35B is used.

By the structure as above, a frequency of use of the first canister 35A and a frequency of use of the second canister 35B are equally maintained, so that it is possible to lengthen the life of the adsorbent.

(Third Embodiment)

Next, a third embodiment in the motorcycle according to the present invention will be explained. Incidentally, members that are the same as or correspond to those of the above-described embodiments are denoted by the same reference numerals and symbols and the explanation is conducted.

In the third embodiment of the present invention in particular, the canisters 35 are first attached inside the rear cowl 26 at the rear of the front ends of the inward portions 14a that reduce the width dimension of the seat rail 14 respectively. By providing the canisters 35 in the inward portions 14a that reduce the width dimension of the seat rail 14 respectively in this manner, it is suppressed that the rear cowl 26 that covers the canisters 35 bulges more than necessary and it is possible to reduce the width dimension of the rear cowl 26 substantially.

Consequently, the rear cowl does not touch the leg parts of the pillion passenger, so that the pillion passenger can perform the knee grip securely and stabilize his/her posture.

In the above case, the inward portions 14a are each provided on a rear portion side of the seat rail 14 and are covered with the rear cowl 26, and on the other hand, a front portion side of the seat rail 14 is exposed and a vehicle appearance is constituted.

In this manner, a position of attaching each of the canisters 35 is set in a preferred region in accordance with the relation of the seat rail 14 and the rear cowl 26 and an improvement in function of the riding comfort or the like is achieved, and further the third embodiment is extremely advantageous also in terms of the appearance constitution.

Further, the canisters 35 are attached to the seat rail 14 that is more inward than outer side ends of the pillion steps 28 respectively. For example, at the time when the vehicle topples over tentatively, the pillion step 28 comes into contact with the ground before the canister 35 comes into contact with the ground, and thus it is possible to prevent the canister 35 from coming into contact with the ground and to secure the high safety to the canisters 35.

In the above, the present invention has been explained wish the various embodiments, but the present invention is not limited only to these embodiments, and modification or the like is possible within a range of the present invention.

In the above-described embodiments, the example where the first canister 35A and the second canister 35B are provided one by one on the right side and the left side has been explained, but it is also possible to provide two or more of the canisters on either the right side or the left side, or on the both sides.

According to the above-described structure, the pillion passenger fits his/her leg parts in the hollow portions provided in the rear cowl respectively, and thereby the distance between his/her knees can be reduced and the knee grip can be performed firmly and his/her posture during running can be stabilized.

Further, according to the above-described structure, the shapes on the right and left of the rear cowl can be maintained equally, so that the vehicle width does not bulge only on one side and the canisters can be enlarged sufficiently. Further, the canisters each can be disposed on the right and left of the vehicle, so that it makes it possible to balance the weight equally on the right and left and it is possible to achieve well-balanced operating feeling at the time of turning.

Further, according to the above-described structure, by providing the canisters in the inward portions that reduce the width dimension of the seat rail respectively, it is possible that the width dimension of the rear cowl is substantially reduced and the knee grip performance by the pillion passenger is improved and his/her posture is stabilized.

Further, at the time when the vehicle topples over, the pillion step comes into contact with the ground before the rear cowl comes into contact with the ground, so that it is possible to prevent the rear cowl from coming into contact with the ground and further to prevent an impulse force from being applied to the canister.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A motorcycle comprising:
a seat rail constituting a rear portion of a vehicle frame;
a rear cowl covering said seat rail; and
a canister adsorbing a vaporized gas generated in a fuel tank disposed on a front portion of the vehicle frame, wherein
as for said canister, a plurality of canisters are constituted to be connected in series,
at least one of said canisters is disposed between one side of said seat rail and said rear cowl,
at least another one of said canisters is disposed between the other side of said seat rail and said rear cowl,
said rear cowl has hollow portions that are each made in a manner that a certain region of a side surface of said rear cowl is recessed,
said canisters are disposed at rear of the hollow portions respectively,
the vehicle frame has a prop stand provided on one side of right and left sides of a vehicle,
said canister on an upstream side connected to the fuel tank is disposed on an outer side surface of said seat rail on a side opposite to the prop stand, and
said canister on a downstream side connected to said canister on the upstream side is disposed on an outer side surface of said seat rail on a side opposite to said canister on the upstream side.

2. The motorcycle according to claim, wherein
the hollow portions are formed so that a pillion passenger that rides on a rear seat is allowed to be seated to have leg parts of the pillion passenger fit along the hollow portions respectively.

3. The motorcycle according to claim 2, further comprising:
pillion steps for the pillion passenger that extend downward under said seat rail respectively;
a front seat disposed on said rear cowl and at rear of the fuel tank; and
the rear seat disposed on said rear cowl and at rear of said front seat, wherein
the hollow portions are disposed between said front seat and said pillion steps in a front and rear direction of the vehicle respectively.

4. The motorcycle according to claim 1, wherein
the hollow portions are each formed so that a most inward point made after a predetermined region is hollowed most inwardly is formed at an upper end of the hollow portion and a dimension in a vehicle width direction is increased as it goes downward from the most inward point.

5. The motorcycle according to claim 4, wherein
the hollow portions are each formed in a substantially inverted triangle shape in which two angles of the substantially inverted triangle shape are included in the upper end in a side view, and
a third angle disposed below the two angles in a vertical direction is disposed on a side at rear of the most inward point in a front and rear direction of the vehicle.

6. A motorcycle comprising:
a seat rail constituting a rear portion of a vehicle frame;
a rear cowl covering said seat rail; and
a canister adsorbing a vaporized gas generated in a fuel tank disposed on a front portion of the vehicle frame, wherein
as for said canister, a plurality of canisters are constituted to be connected in series,
at least one of said canisters is disposed between one side of said seat rail and said rear cowl,
at least another one of said canisters is disposed between the other side of said seat rail and said rear cowl,
said seat rail has an inward portion whose dimension in a vehicle width direction reduces as it goes rearward provided in side surfaces thereof, and said canisters are disposed at rear of front ends of the inward portions and between said rear cowl and said seat rail respectively.

7. The motorcycle according to claim 6, wherein
the inward portions are each provided on a rear portion side of said seat rail and are covered with said rear cowl, and
a front portion side of said seat rail is exposed to an outside of said rear cowl.

8. The motorcycle according to claim 6, further comprising:
pillion steps for a pillion passenger that extend downward under said seat rail respectively, wherein
said canisters are attached to said seat rail positioned more inwardly than outer side ends of said pillion steps respectively.

9. A motorcycle comprising:
a seat rail constituting a rear portion of a vehicle frame;
a rear cowl covering said seat rail; and
a canister adsorbing a vaporized gas generated in a fuel tank disposed on a front portion of the vehicle frame, wherein as for said canister, a plurality of canisters are constituted to be connected in series,
at least one of said canisters is disposed between one side of said seat rail and said rear cowl,
at least another one of said canisters is disposed between the other side of said seat rail and said rear cowl,
said rear cowl has hollow portions that are each made in a manner that a certain region of a side surface of said rear cowl is recessed,
said canisters are disposed at rear of the hollow portions respectively,
the hollow portions are formed so that a pillion passenger that rides on a rear seat is allowed to be seated to have leg parts of the pillion passenger fit along the hollow portions respectively,
the hollow portions are each formed so that a most inward point made after a predetermined region is hollowed most inwardly is formed at an upper end of the hollow portion and a dimension in a vehicle width direction is increased as it goes downward from the most inward point.

* * * * *